United States Patent
Helgert

(10) Patent No.: US 7,543,699 B2
(45) Date of Patent: Jun. 9, 2009

(54) ENDLESS CONVEYOR

(75) Inventor: Thomas Helgert, Vohenstrauss (DE)

(73) Assignee: Siemens Aktiengesellachaft, Munich (DE)

( * ) Notice: Subject to any disclaimer, the term of this patent is extended or adjusted under 35 U.S.C. 154(b) by 0 days.

(21) Appl. No.: 11/903,801

(22) Filed: Sep. 25, 2007

(65) Prior Publication Data

US 2008/0110730 A1    May 15, 2008

(30) Foreign Application Priority Data

Sep. 27, 2006  (DE) .................. 10 2006 045 694

(51) Int. Cl.
    *B65G 15/02*     (2006.01)
(52) U.S. Cl. .................. 198/831; 198/817; 198/850
(58) Field of Classification Search .......... 198/831, 198/834, 835, 850, 851, 853, 817
    See application file for complete search history.

(56) References Cited

U.S. PATENT DOCUMENTS

| 3,643,792 | A | | 2/1972 | Resener | |
|---|---|---|---|---|---|
| 3,910,404 | A | * | 10/1975 | Henrekson | 198/835 |
| 4,078,654 | A | * | 3/1978 | Sarovich | 198/850 |
| 4,711,346 | A | * | 12/1987 | Breher et al. | 198/850 |

FOREIGN PATENT DOCUMENTS

| BE | 491893 | 10/1949 |
|---|---|---|
| DE | 567 596 | 1/1933 |
| DE | 629 566 | 5/1936 |
| DE | 957 374 | 1/1957 |
| DE | 966 679 | 8/1957 |
| DE | 1 032 165 | 6/1958 |
| DE | 2356067 A1 | 5/1974 |
| DE | 2 409 958 | 9/1974 |
| DE | 27 22 320 A1 | 11/1977 |
| DE | 34 37 049 A1 | 4/1985 |
| DE | 37 14 060 C2 | 2/1988 |
| DE | 31 04 262 C2 | 5/1988 |
| DE | 196 37 624 A1 | 3/1998 |
| EP | 0629566 | 12/1994 |
| EP | 0 869 086 B1 | 10/1998 |
| EP | 1440921 A1 | 7/2004 |
| FR | 1090811 | 4/1955 |
| FR | 1295249 | 12/1962 |
| WO | 9957044 A1 | 11/1999 |

* cited by examiner

*Primary Examiner*—James R Bidwell

(57) ABSTRACT

An endless conveyor, in particular a link conveyor for items of baggage in the baggage-reclaim area of an airport, which, by very straightforward and functionally reliable design, is to replace the expensive, heavy and maintenance-intensive prior-art conveyor guided on link chains. According to the invention, it is proposed that the traction device provided for the endless conveyor is a cable, in particular wire cable, which connects the conveying elements and on which the conveying elements are fastened at defined intervals such that they can negotiate curves and gradients, and that driving takes place preferably via a linear drive.

7 Claims, 1 Drawing Sheet

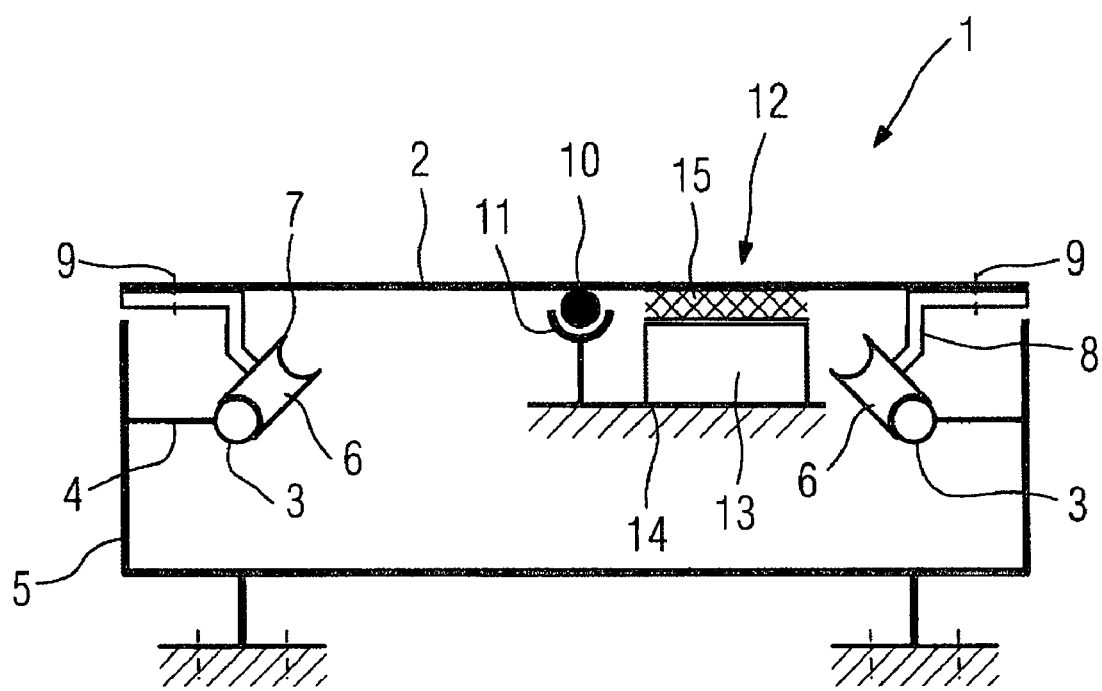

ENDLESS CONVEYOR

CROSS REFERENCE TO RELATED APPLICATIONS

This application claims priority of German Patent application No. 10 2006 045 694.7 filed Sep. 27, 2006, which is incorporated by reference herein in its entirety.

FIELD OF INVENTION

The invention relates to an endless conveyor with a conveying path curved in different directions in space, in particular a link conveyor for items of baggage in the baggage-reclaim area of an airport, of which the preferably overlapping conveying elements, which carry the items, are connected to one another via a traction means to form an endless circulating strand.

BACKGROUND OF THE INVENTION

Conveyors of the type mentioned in the introduction are used, in particular, in baggage-sorting areas and in baggage-reclaim areas of airports. Passengers can pick up their baggage there after landing, the baggage being made available there on the conveyor. Conveyors of the generic type are also used in the check-in area, that is to say where the passenger hands over the baggage. Depending on the architecture and the size of the building, the conveying path often follows winding routes, in which case link chains which transmit the propelling force have to be guided, in some cases, around narrow-radius curves and, in some cases, also have to negotiate changing gradients. It is thus occasionally the case that the jointing of such a link chain is insufficient. The high weights of the items for conveying and of the conveyor itself, and the pronounced deflections of the conveying path, additionally give rise to considerable forces on the link chain, on which the conveying elements are fastened, as it circulates.

EP 0 629 566 A2 has already disclosed a conveyor of the above construction, although its link chain has a three-dimensional flexibility which is insufficient for many applications. Another conveyor of the type mentioned in the introduction is known from EP 0 869 086 B1, in the case of which the link chain has joints with successive axes of rotation arranged perpendicularly to one another in each case. One disadvantage of this arrangement is that the effective length of the link, that is to say the spacing between two joints of the chain, is doubled here in respect of a certain direction of curvature because, for example in the case of the link chain bending in a horizontal direction, only every second link is capable of deflection and the ones located therebetween, as it were, remain stiff. Accordingly, the angularity of the polygonal extent of the chain increases disadvantageously over curved regions. This results in very high loading on the joints which, on account of the axis of rotation being oriented parallel to the plane of curvature, remain, as it were, stiff. Overall, the chain drive is subject to increased wear since the jerky advancement on account of the polygonal shape of the deflections results in comparatively high forces in the chain strands. Both chains involve very high-outlay and are heavy; they require a correspondingly large amount of installation space and are expensive. The chains are difficult to maintain, in particular the removal of damaged chain links is time-consuming and laborious, in which case the conveyors are unavailable for operation for a relatively long period of time.

SUMMARY OF INVENTION

The object of the present invention is to improve an endless conveyor of the type described in the introduction, in particular one for transporting items of baggage in the baggage-reclaim area of an airport, such that, by very straightforward and functionally reliable means, it is possible to negotiate a curved conveying path without the expensive, heavy and maintenance-intensive prior-art link chains having to be used for fastening the conveying element and as traction means.

The object is achieved according to the invention in that the traction means is designed as a cable, in particular wire cable, which connects the conveying elements and on which the conveying elements are fastened at defined intervals such that they can negotiate curves and gradients. The cable thus serves both for fastening, and for spacing apart, the individual conveying elements, the latter being clamped at desired intervals onto the cable. The cable itself is a very lightweight component which, in addition, can be used in a space-saving manner.

In a development of the invention, it is provided that the cable is guided for sliding action in a guide fastened directly or indirectly on the floor. This sliding-action guide serves for stabilizing the position of the cable even along curved sections, and ensures that the spacings between the conveying elements are maintained even along curves of the conveying path.

In one configuration, the sliding-action guide may be designed as a channel which runs in the direction in which the endless conveyor circulates, partially engages around the cable and prevents the cable from being deflected laterally along curved sections.

According to the invention, the conveying elements are connected to the cable via drivers which are configured for movement in space such that they allow the conveying path to negotiate curves and/or gradients. This can be made possible, for example, by the driver being ball-jointed to a limited extent between the conveying elements and the cable.

The conveying elements, as is known for the conveyors of the generic type, are preferably of plate-like design and are borne, by way of their two outer sides, on guides running parallel to the conveying route. The guides run in the transporting direction and guarantee that the endless conveyor has a defined conveying route.

In an advantageous configuration, it is proposed that the conveying elements are provided, on the two outer sides, with rollers which are retained in crossmembers and run on the guides in the transporting direction. These rollers very advantageously reduce the friction of the conveying elements on the guides and stabilize the operation of the endless conveyor by the rollers being borne on the guides.

The guides are advantageously designed as tubes, and the rollers rolling thereon have a concave running surface which corresponds with the tube profile.

It is considered to be particularly advantageous if, in order to drive the endless conveyor, at least one linear motor is arranged by way of a static primary part, beneath the conveying element, on the floor or frame of the endless conveyor, the secondary part of the linear motor being fastened on the underside of the conveying element.

The use of one or more linear motors, on the one hand, has the advantage of very low-wear driving, and, at the same time, proves to be very quiet in relation to the drive chains currently used in the prior art. The very straightforward design of the endless conveyor also results in servicing being more straightforward and less costly, and use of the cable means that chain links no longer need to be changed, in which case stoppage times of the installation, for necessary changeover of the conveying element, are reduced to an absolute minimum.

BRIEF DESCRIPTION OF THE DRAWINGS

FIGURE an exemplary embodiment of the invention is illustrated schematically.

DETAILED DESCRIPTION OF INVENTION

The single FIGURE of the drawing shows a roughly schematic illustration of the cross section through an endless conveyor according to the invention in the direction transverse to the transporting direction thereof. The endless conveyor is designated overall by 1; it comprises a finite number of plate-conveying elements 2 for receiving items of baggage (not illustrated) at the baggage reclaim in the arrivals hall of an airport. The conveying elements overlap in the transporting direction in a known manner and advance by being driven over an endless path. The function of guiding the conveying elements is performed by guides 3 which are provided on the two outer sides of the conveying elements and, in the exemplary embodiment, are designed as tubes. The tubes are fastened on the frame 5 of the endless conveyor at 4 and run in, and parallel to, the transporting direction. For guiding the conveying elements 2, rollers, designated by 6, roll on the tubes in the transporting direction, the running surfaces of these rollers being of concave design, as can be seen at 7, in which case the running surfaces partially engage around the tubes 3. The rollers 6 are mounted for rotation on crossmembers 8 which, for their part, are fixed, at 9, to the underside of the conveying element 2. Each of these conveying elements 2 is provided with two crossmembers 8 arranged on both sides, in which case each individual conveying element 2 rolls on the guide paths formed from tubes.

In order to hold the conveying elements together in the transporting direction, and nevertheless to allow curves to be negotiated even in the vertical direction, a cable 10, preferably a wire cable, runs centrally along the transporting path of the endless conveyor 1, the conveying elements being connected individually to this cable. This takes place, for example, via drivers (not illustrated) which are connected to the cable 10 and are jointed in a known manner at least to the extent of allowing the conveying elements 2 to move over curves and/or gradients. The cable 10 is guided in a cross-sectionally shell-like channel 11, and this channel, which runs centrally between the guides 3, follows the course of the conveying path. The cable serves, in particular, for connecting the conveying elements 2 in a jointed manner and allows the correct spacing to be set between the individual conveying elements 2.

The endless conveyor is preferably driven via a linear drive 12, of which the stator 13 is illustrated symbolically on the base or frame of the endless conveyor, as at 14. The channel 11 for the wire cable 10 may also be fastened at this location. The movable part of the linear motor 15 is fastened on the underside of the conveying elements 2, in which case, when the linear motor 12 is switched on, the conveying elements are advanced in the transporting direction. Of course, it also possible for a number of linear motors to be used in order to advance the endless conveyor over relatively long conveying paths.

The invention claimed is:

1. An endless link conveyor for conveying items of baggage to a baggage-reclaim area of an airport, comprising:
   a conveying path curved in a plurality of directions;
   a plurality of overlapping conveying elements having an underside and an upper side that carries the baggage items;
   a wire cable fastened to the plurality of conveying elements to form an endless flexible circulating strand such that the strand can negotiate the conveying path; and
   a linear motor having:
      a static primary part arranged beneath the conveying element on a base or frame of the endless conveyor, and
      a secondary part fastened on the underside of the conveying element.

2. The endless conveyor as claimed in claim 1, wherein the cable is guided for sliding action in a guide fastened directly or indirectly on the base or frame of the endless conveyor.

3. The endless conveyor as claimed in claim 2, wherein the guide is a channel that runs in a direction of the endless conveyor circulation and partially engages around the cable.

4. The endless conveyor as claimed in claim 3, wherein the conveying elements are connected to the cable via drivers that provide for movement in space which allows the conveying path to negotiate curves and/or gradients.

5. The endless conveyor as claimed in claim 4, wherein the conveying elements are of plate-like design and are borne, by way of their two outer sides, on guides running parallel to the conveying path.

6. The endless conveyor as claimed in claim 5, wherein the conveying elements are provided, on the two outer sides, with rollers which are retained in the crossmembers which roll on the guides in the transporting direction.

7. The endless conveyor as claimed in claim 6, wherein the guides are tubes, and the rollers have a concave running surface that corresponds with the tube profile.

* * * * *